(12) United States Patent
Olson et al.

(10) Patent No.: US 8,133,000 B2
(45) Date of Patent: Mar. 13, 2012

(54) BOAT LOADING AND UNLOADING SYSTEM

(75) Inventors: Wayne L. Olson, Central Point, OR (US); Kenneth Raymond Monroe, Central Point, OR (US); Charles M. McNair, Medford, OR (US)

(73) Assignee: Rogue Otter System, LLC, Medford, OR (US)

( * ) Notice: Subject to any disclaimer, the term of this patent is extended or adjusted under 35 U.S.C. 154(b) by 314 days.

(21) Appl. No.: 12/079,504

(22) Filed: Mar. 26, 2008

(65) Prior Publication Data

US 2008/0260508 A1 Oct. 23, 2008

Related U.S. Application Data

(60) Provisional application No. 60/920,169, filed on Mar. 26, 2007.

(51) Int. Cl.
*B60P 1/43* (2006.01)
*B60P 3/10* (2006.01)
(52) U.S. Cl. .......................... 414/538; 414/462; 224/310
(58) Field of Classification Search .................. 224/310, 224/492, 504; 414/462, 538
See application file for complete search history.

(56) References Cited

U.S. PATENT DOCUMENTS

| | | |
|---|---|---|
| 3,048,291 A | 8/1962 | Maybry |
| 3,128,893 A | 4/1964 | Jones |
| 3,170,583 A | 2/1965 | Meyer |
| 3,343,696 A | 9/1967 | Morrison |
| 3,708,081 A | 1/1973 | Schladenhauffen |
| 3,872,989 A | 3/1975 | Smithson et al. |
| 3,877,594 A * | 4/1975 | Coakley ........................ 414/462 |
| 3,894,643 A | 7/1975 | Wilson |
| 3,927,779 A * | 12/1975 | Johnson ........................ 414/462 |
| 4,239,438 A | 12/1980 | Everson |
| 4,269,561 A | 5/1981 | Rutten |
| 4,274,788 A * | 6/1981 | Sutton ........................... 414/462 |
| 4,439,086 A | 3/1984 | Thede |
| 4,531,879 A | 7/1985 | Horowitz |
| 4,953,757 A | 9/1990 | Stevens et al. |
| 5,108,248 A * | 4/1992 | Murrill ......................... 414/462 |
| 5,354,164 A | 10/1994 | Gross et al. |
| 5,447,408 A | 9/1995 | Smith |
| 5,505,579 A * | 4/1996 | Ray et al. ..................... 414/462 |
| 5,511,928 A | 4/1996 | Ellis |
| 5,542,810 A * | 8/1996 | Florus ......................... 414/538 |
| 5,609,462 A | 3/1997 | Reimer |
| 7,131,561 B2 * | 11/2006 | Humes ......................... 224/319 |

* cited by examiner

*Primary Examiner* — James Keenan
(74) *Attorney, Agent, or Firm* — Chernoff Vilhauer McClung & Stenzel, LLP

(57) ABSTRACT

A system for loading, unloading and carrying a boat, upright with motor, on a vehicle includes a raised carrying rack positioned at an incline above the vehicle and a loading arm extending rearwardly from the back of the vehicle and supported in cantilever fashion by cables. A winch, cable and pulley system pulls the boat out of the water, onto the loading arm, up onto rollers at the rear of the carrying rack, and to the forward end of the carrying rack where it is secured. The loading arm may be folded upright after the boat is loaded on the carrying rack.

19 Claims, 5 Drawing Sheets

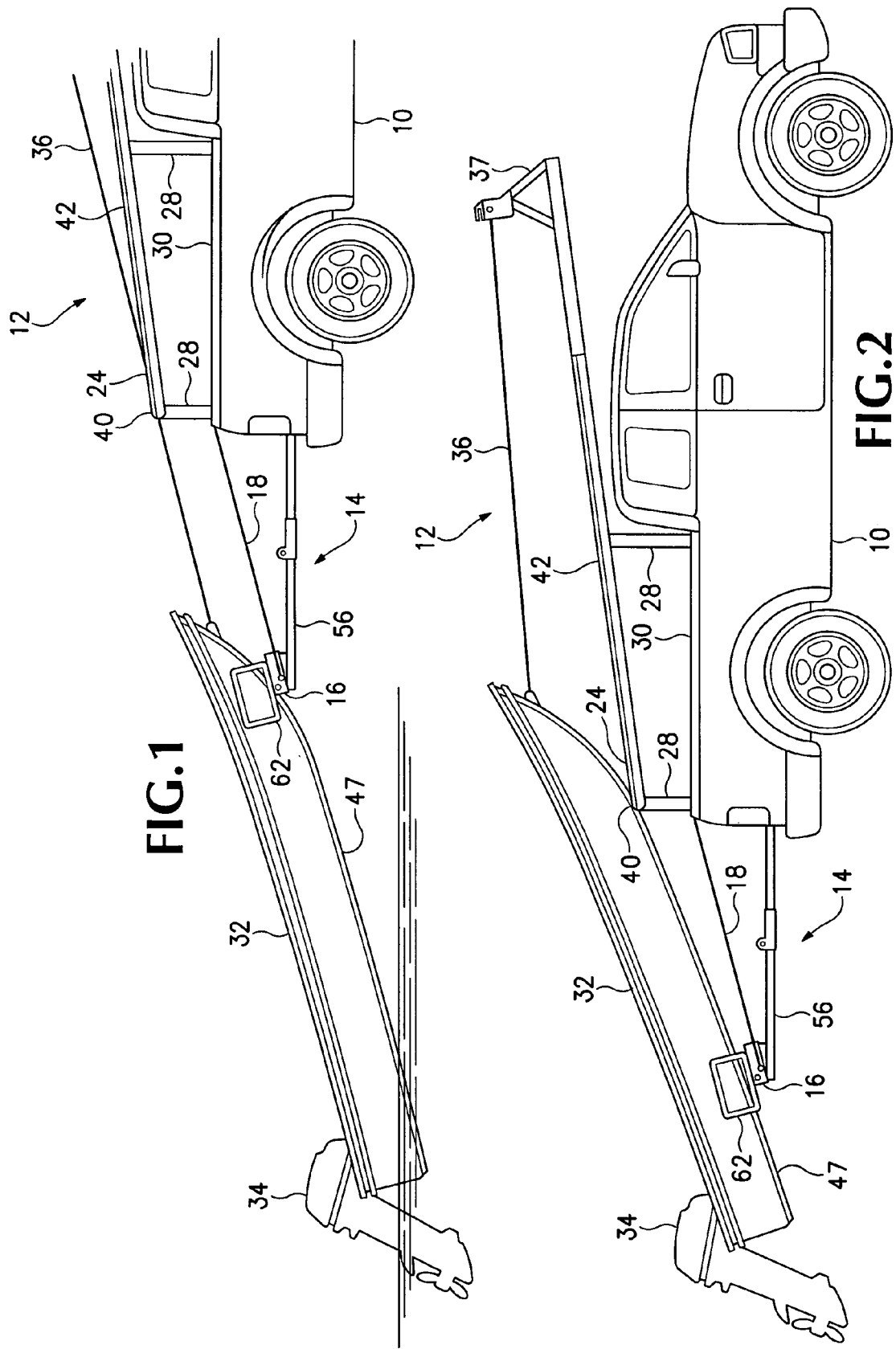

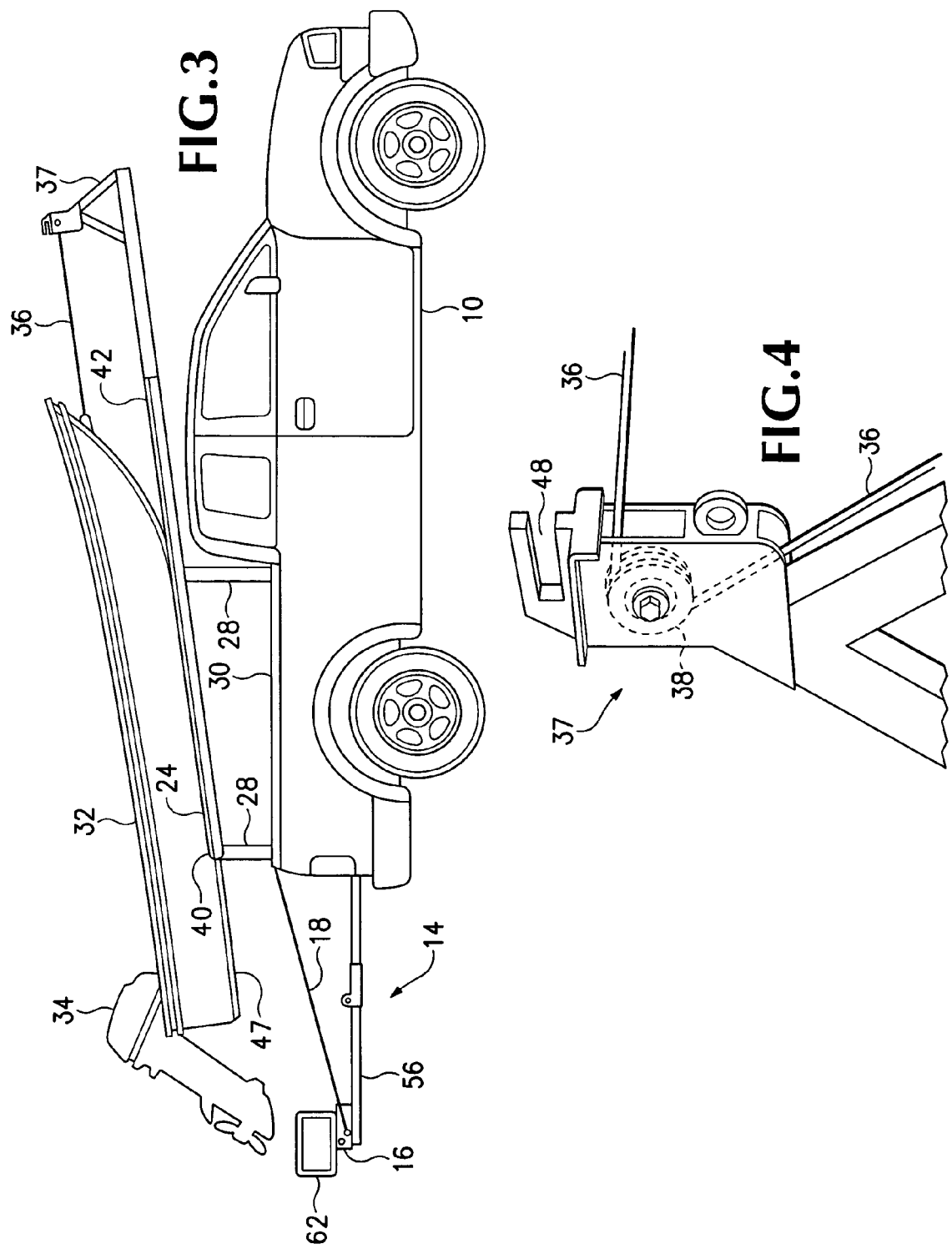

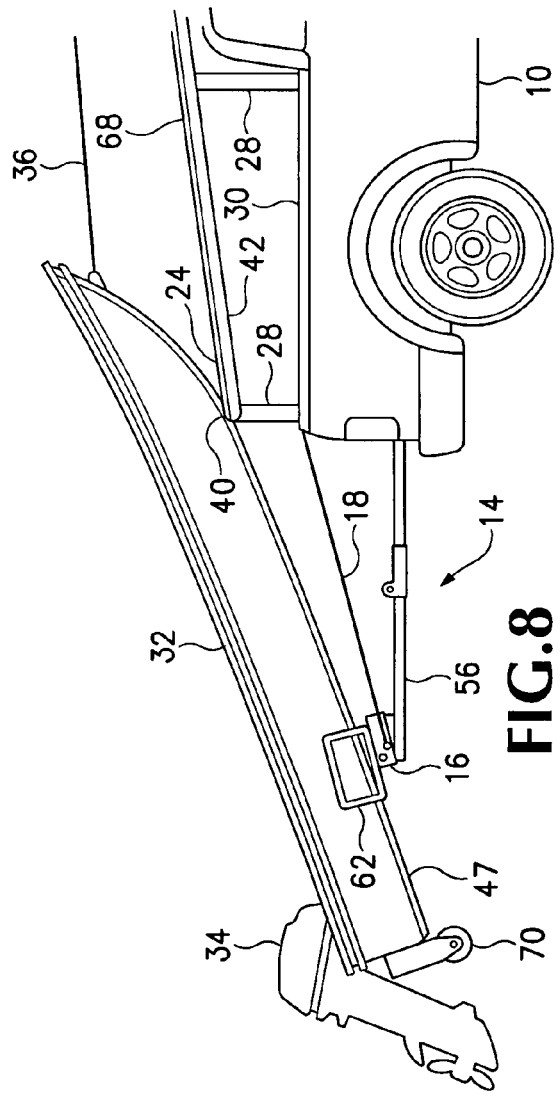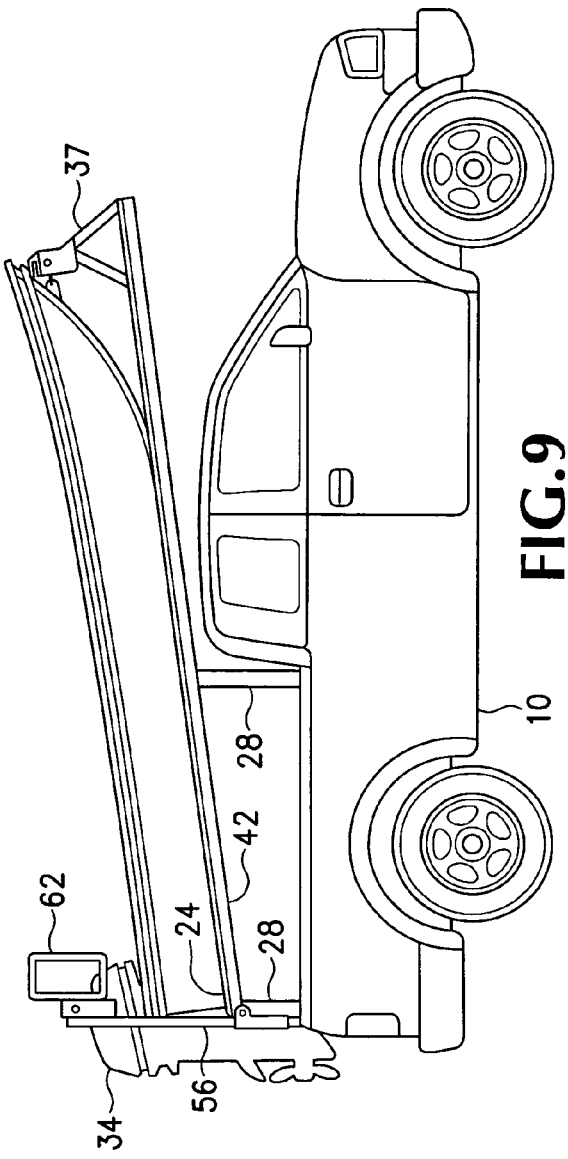

US 8,133,000 B2

BOAT LOADING AND UNLOADING SYSTEM

CROSS REFERENCE TO RELATED APPLICATIONS

This is patent application claims priority of U.S. Provisional Patent Application No. 60/920,169, filed Mar. 26, 2007.

TECHNICAL FIELD OF THE INVENTION

This invention relates to a system for loading and unloading a boat or other object from a raised carrying rack mounted on a vehicle.

BACKGROUND OF THE INVENTION

For many reasons it is sometimes desirable to transport a boat on top of a vehicle rather than towing it behind the vehicle. A disadvantage associated with this method of transport is loading and unloading the boat from the vehicle. Further challenges are presented if one desires to load and transport a boat with contents and a mounted motor in an upright position and to offload the boat directly into the water.

The mounted motor presents a special problem because the shaft and propellers are likely to dig into the ground or streambed if the unloading angle is too sharp. For example, U.S. Pat. No. 5,609,462 employs a tilting carrying rack and transom wheels on the boat to keep the motor from hitting the ground.

The present invention provides a raised, angled carrying rack and a lower, adjustable, foldable loading arm to enable a boat with mounted motor and contents to be loaded upright on the carrying rack.

Features and advantages of the present invention will be more readily understood upon consideration of the following detailed description of the invention taken in conjunction with the accompanying drawings.

BRIEF DESCRIPTION OF THE DRAWINGS

FIGS. 1-3 are side elevation views showing a boat with motor being loaded onto an exemplary carrying rack of the present invention.

FIG. 4 is a perspective view of an exemplary pulley stand having a bow retention device.

FIG. 8 is a side elevation view of a boat with extended transom wheels being loaded or unloaded from the exemplary carrying rack.

FIG. 9 is a side elevation view of a boat secured in the exemplary carrying rack with the loading arm folded into a vertical position.

DETAILED DESCRIPTION OF THE INVENTION

Figure 5:
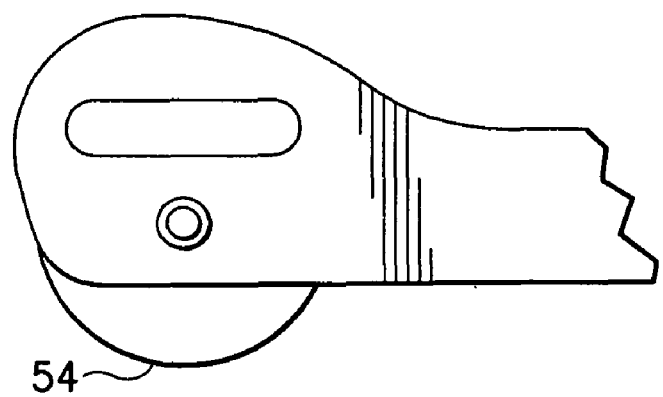
FIG. 5 is a side elevation view of an exemplary bow piece of the boat.

FIGS. 1-3 show an exemplary boat loading and unloading system loading a boat 32 with motor 34 from the water onto a raised carrying rack 12. The system includes the raised carrying rack 12 and a loading arm 14 shown in extended cantilevered position. The outer end 16 of the loading arm 14 is supported by cables 18 attached to upright posts 28 which are fastened to the bed 30 of truck 10.

The raised carrying rack 12 is positioned at a fixed angle with respect to the truck 10 such that the forward end 22 of the carrying rack extends above the cab of the truck 10 and rearward end 24 of the carrying rack is positioned above the rear of the truck. Substantially upright posts 28 support the rack above the truck bed 30 and cab. Further bracing 50 for supporting the carrying rack 12 is fastened to the truck bed 30.

FIG. 1 shows a boat 32 with outboard motor 34 with its stern in the water. The truck 10 is backed to the water's edge and the loading arm 14 extends rearwardly over the water. A winch cable 36 is attached to the bow of the boat 32 and the boat is being pulled up onto the outer end 16 of the loading arm 14.

FIG. 2 shows the boat 32 partially supported by the loading arm 14 and partially by the carrying rack 12. A winch cable 36 runs to a pulley 38 mounted on a pulley stand 37 on the forward end 22 of the carrying rack 12. The exemplary carrying rack 12 includes a fulcrum 40 located above the truck bed 30. When the center of gravity of the boat 32 with motor 34 moves forward of the fulcrum 40, the stern of the boat raises off the loading arm 14 and the forward portion of the boat 32 settles on the rack 12.

FIG. 9 shows the boat 32 fully received on the carrying rack 12. The bow of the boat is snugged against the pulley stand 37 and held there by tension on the winch cable 36. The loading arm 14 has been pivoted to an upright position behind the stern of the boat 32.

Figure 7:
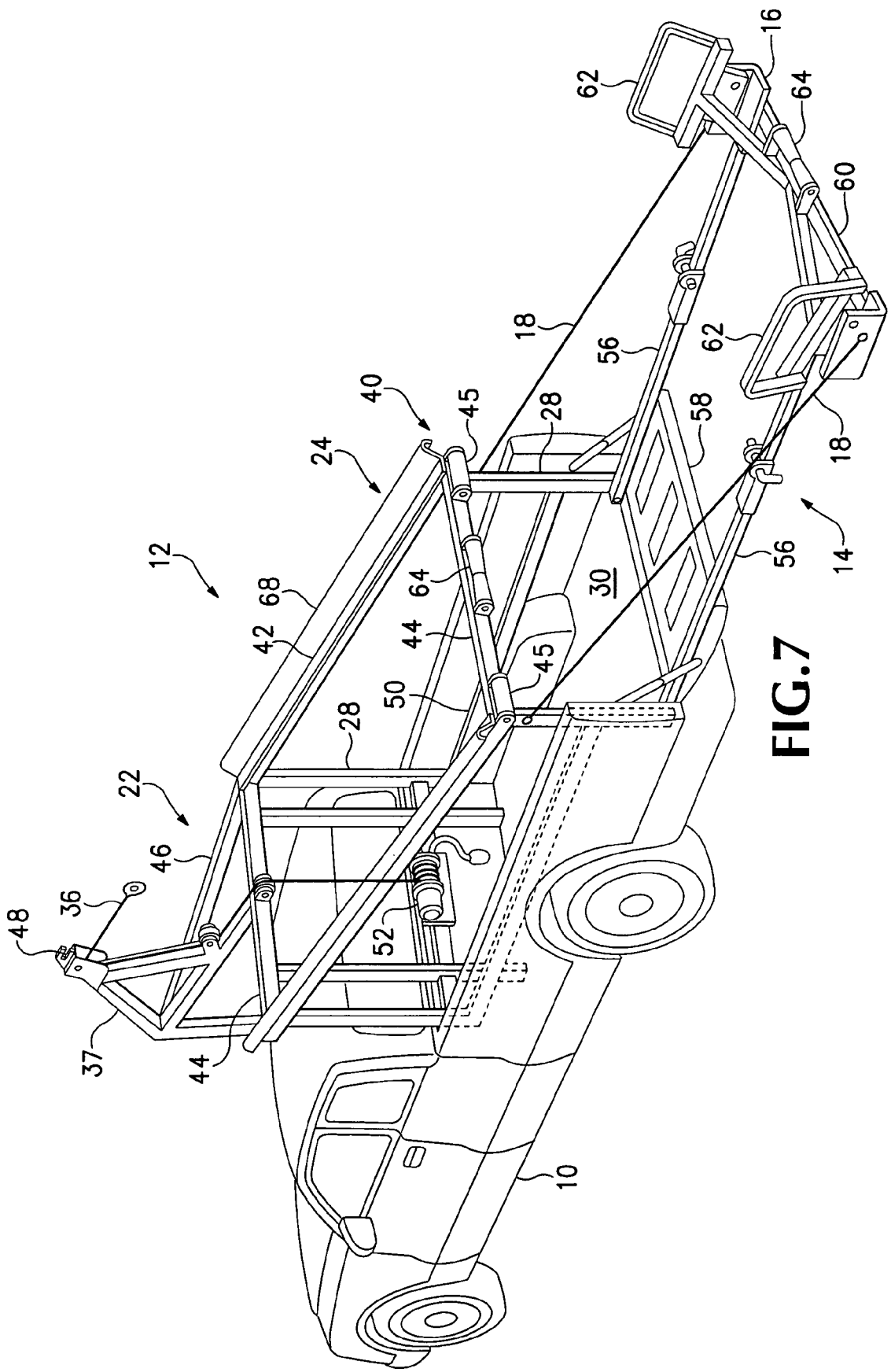
FIG. 7 is a perspective view of the exemplary rack mounted upon a pickup truck with the loading arm in extended position.

More details of the exemplary loading and unloading system may be seen in FIG. 7. The raised carrying rack 12 comprises a frame including a pair of opposed parallel rails 42 joined by front and rear transverse members 44. The front section 46 of the carrying rack 12 supports the pulley stand 37. The rear transverse member 44 includes a pair of chine rollers 45 just to the rear of the rails 42. The angled chines 47 of the boat 32 pass over the chine rollers 45 and onto the rails 42. The boat is supported by its chines 47 on carrying rack 12 by the rails 42. The rear transverse member 44 also mounts a center V-roller 64 to help center the boat 32 on the carrying rack. The V-roller 64 and chine rollers 45 act as a fulcrum about which the boat pivots as the center of gravity passes the rollers 64 and 45.

As shown in FIGS. 4 and 7, the pulley stand 37 includes a raised pulley 38. In the exemplary embodiment, the winch cable 36 is fastened to the bow of the boat 10, goes around the raised pulley 38 and downwardly to a winch 52 mounted in the bed 30 of the truck 10. As shown in FIGS. 4 and 5, the pulley stand includes a mouth 48 which receives a bow piece 54 to prevent the bow of the boat from lifting or falling when the bow piece 54 is received in the mouth 48.

Returning to FIG. 7, in the exemplary embodiment, the loading arm 14 includes a pair of adjustable length elongate arms 56. The inner ends of the arms are pivotably attached to the bottom of the rear upright posts 28 and rest on the extended tailgate 58 of the truck 10. A crosspiece 60 joins the outer ends 16 of the arms 56. Guides 62 and a V-roller 64 center the boat 32 on the loading arm 14. A pair of cables 18 extend from the respective upright posts 28 to the ends 16 of the respective adjustable arms 56. The cables 18 and the extended tailgate 58 support the loading arm 14 in cantilevered fashion.

Figure 6:
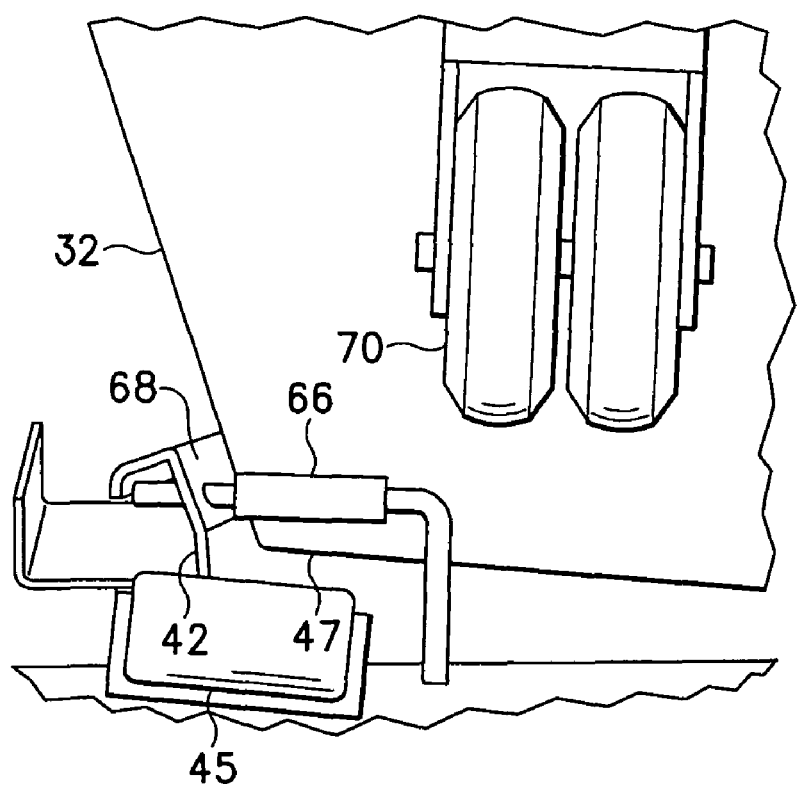
FIG. 6 is a partial rear elevation view of the transom of an exemplary boat showing a portion of an exemplary rack and a locking pin.

Referring to FIG. 6, when the boat 32 is fully received in the carrying rack, retention devices, such as locking pins 66 releasably attach the stern of the boat 32 to the raised carrying rack 12. As may be seen in FIG. 7, the rails 42 include an upright outer wall 68, to closely fit the chines 47 of boat 32 and prevent the boat from moving side-to-side while in the carrying rack 12. Preferably the rails 42 and upright walls 68 comprise or are faced with a slippery material with a low coefficient of friction to enable the boat 32 to slide easily on or off the carrying rack 12. The rails 42, stern locking pins 66, winch cable 36 and attachment of the bow piece 54 to the pulley stand 37 securely hold the boat 32 on the carrying rack 12 without the need for further straps or tie-downs.

The boat 32 may be fitted with detachable, retractable transom wheels 70 shown in FIG. 6. When the wheels 70 are dropped into position below the level of the hull as shown in FIG. 8, the boat may be off-loaded onto dry land and moved about.

It will be understood from the previous description that it is necessary that the boat fit the rack, or vice versa. With reasonable consideration of the size and capacity of the vehicle, boats in the range of 12-16 feet are best adapted to this type of system. Such boats are considered too large to be carried as a car-topper, particularly with the motor attached, and are often towed on a trailer. The raised carrying rack 12 permits the vehicle to carry a boat and tow a trailer, such as a travel trailer or utility trailer. Further, while the system is shown and described with the boat facing forward and the loading arm 14 extending rearward of the vehicle, the system could be reversed on the vehicle with the folding loading arm 14 mounted on the front of the vehicle. In operation, the loading arm 14 would be extended forward of the vehicle and folded to an upright position while the vehicle is being operated.

The exemplary system can be designed to be adjustable in length, width and angle to suit the size of the boat, or even to accommodate boats of varying sizes.

The boat shown in the drawings has a modified V-hull. The carrying rack 12 and loading arm 14 could be configured to accept a boat with a more modest Vee, or a deeper Vee with use of appropriately angled rollers.

The system could also be used to load, unload and carry materials or items other than a boat.

While it is contemplated that the system is built from welded aluminum, other materials including steel and composite materials would be suitable.

The support arm 14 is shown supported in cantilevered configuration supported by a cable. However, other variations are possible. For example, the elongate adjustable arms 56 could carry folding legs which could be lowered to support the loading arm 14.

While the system is designed such that the weight of the boat will be sufficient to lower the boat off the carrying rack, a system which uses a winch or other device to pull the boat off the rack is possible.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A mechanism for loading, unloading and carrying a unitary object which is used separately from the vehicle loading, unloading and carrying mechanism on to an elongate vehicle having first and second ends, said mechanism comprising:
   a. a carrying rack mounted on said vehicle, said rack including a pair of elongate rails which are configured to contact and directly support said object when it is carried on said rack and have first and second ends, said first end of said rails positioned generally toward said first end of said vehicle and second end of said rails positioned generally toward said second end of said vehicle, said carrying rack being configured to be attached to said vehicle in a manner which prevents any portion of said mechanism from moving relative to said vehicle during, before, and after the loading or unloading of said object;
   b. at least one fulcrum located above said vehicle generally proximate said second end of said rails;
   c. a loading arm located entirely below the level of said carrying rack, extending longitudinally in a direction away from said second end of said vehicle;
   d. a first tensile member, operatively associated with said carrying rack, capable of attaching to said object and pulling said object substantially onto said carrying rack; wherein
   e. said loading arm has a first end which is attached to said vehicle independently of said mechanism and cantilevers outwardly from said vehicle, and a second end opposite said first end, including a second tensile member extending between said vehicle and said second end of said loading arm supporting said loading arm in an extended cantilevered position.

2. The mechanism of claim 1 wherein said fulcrum includes a transverse member extending between said rails.

3. The mechanism of claim 1 wherein said fulcrum includes at least one roller.

4. The mechanism of claim 1 wherein said first tensile member is flexible.

5. The mechanism of claim 1 wherein said loading arm may be pivoted from an extended position to a raised position.

6. The mechanism of claim 1 wherein said loading arm includes a transverse member.

7. The mechanism of claim 1 wherein said loading arm includes a pair of opposed centering surfaces to center said object to be loaded with respect to said loading arm.

8. The mechanism of claim 7 wherein said opposed centering surfaces include opposed portions of a V-roller.

9. The mechanism of claim 1 wherein said rails support said object above said vehicle when said object is on said carrying rack.

10. The mechanism of claim 1 wherein said rails include a raised portion configured to prevent lateral movement of said object when it is positioned on said carrying rack.

11. The mechanism of claim 1 wherein the length of said loading arm is adjustable.

12. The mechanism of claim 1 wherein said loading arm pivots about an axis substantially transverse to said vehicle.

13. The mechanism of claim 1 wherein said second end of said vehicle is the rear end of said vehicle.

14. The mechanism of claim 1 wherein said object is a boat having a hull, at least a portion of said hull having angled chines, said rails including raised sides adapted to fit an upwardly angled portion of said hull proximate said chines.

15. The mechanism of claim 1 wherein said vehicle is a pickup truck having a tailgate, said tailgate when lowered supporting a portion of said loading arm in cantilevered fashion.

16. The mechanism of claim 1 wherein said object is a boat with an outboard motor mounted on a transom.

17. The mechanism of claim 1 wherein said loading arm is configured to be attached to said vehicle in a manner which prevents substantial movement of said loading arm toward either end of said vehicle during the loading of said object onto said carrying rack.

18. The mechanism of claim 1 wherein said loading arm is oriented substantially horizontally.

19. The mechanism of claim 1 wherein said vehicle is a pickup truck having an open bed, and said rack is supported by said bed.

* * * * *